United States Patent [19]

Levesque

[11] Patent Number: 4,726,043
[45] Date of Patent: Feb. 16, 1988

[54] DATA DECISION-DIRECTED TIMING AND CARRIER RECOVERY CIRCUITS

[75] Inventor: Louis Y. Levesque, Salem, N.H.

[73] Assignees: American Telephone and Telegraph Company, New York, N.Y.; Bell Telephone Laboratories, Incorporated, Murray Hill, N.J.

[21] Appl. No.: 935,940

[22] Filed: Nov. 28, 1986

[51] Int. Cl.⁴ .............................................. H04L 7/02
[52] U.S. Cl. ........................................ 375/96; 375/97; 375/110
[58] Field of Search ...................... 375/39, 27, 96, 97, 375/110, 111, 113; 370/20, 100; 371/46, 47; 329/50, 110; 328/72, 74, 151, 155; 332/19

[56] References Cited

U.S. PATENT DOCUMENTS

| | | | |
|---|---|---|---|
| 3,436,480 | 4/1969 | Pan | 375/111 |
| 3,440,548 | 4/1969 | Saltzberg | 328/151 |
| 4,021,757 | 5/1977 | Nossen | 332/19 |
| 4,206,425 | 6/1980 | Nossen | 332/19 |
| 4,253,189 | 2/1981 | Lemoussu et al. | 375/96 |
| 4,404,675 | 9/1983 | Karchevski | 371/47 |
| 4,426,712 | 1/1984 | Popiel | 375/96 |
| 4,494,239 | 1/1985 | Martin | 375/39 |
| 4,646,329 | 2/1987 | Bojarski | 375/113 |

Primary Examiner—Benedict V. Safourek
Attorney, Agent, or Firm—David R. Padnes

[57] ABSTRACT

The performance of carrier and/or timing recovery circuits which control the recovery of data signals from modulated quadrature-related carrier signals is improved by the use of a phase detector which correlates the two most significant bits of the data signals. This correlation significantly reduces the acquisition time, i.e., the time required for these circuits to acquire synchronous operation. Moreover, this correlation can be advantageously combined with correlations of the most and least significant bits of the data signals to reduce phase jitter as well as reduce the acquisition time.

8 Claims, 3 Drawing Figures

DATA DECISION-DIRECTED TIMING AND CARRIER RECOVERY CIRCUITS

TECHNICAL FIELD

The invention relates to digital communications systems and, more particularly, to improved timing and carrier recovery circuits which control the recovery of data signals from modulated quadrature-related carrier signals.

BACKGROUND OF THE INVENTION

In one modulation format commonly used in communication systems, data signals modulate a pair of quadrature-related carrier signals, i.e. carrier signals having the same frequency and a phase angle of 90 degrees therebetween. Such modulation is referred to by a variety of names, such as quadrature amplitude modulation (QAM), phase shift keying (PSK) or amplitude and phase shift keying (APSK). The data signal can, of course, represent a virtually limitless array of information, such as voice, video, facsimile and the like. In addition, the transmission channel propagating the modulated carrier signals is also not limited, and, at present, may include air, wire or lightguide.

In communications systems in which modulated quadrature-related carrier signals are transmitted, recovery of the data signals is controlled by carrier and timing recovery circuits within the receiver which respectively generate replicas of the carrier and timing signals used in the transmitter. In particular, the carrier recovery circuit generates local carrier signals which are used to demodulate the quadrature-related carrier signals and the timing recovery circuits are used to generate clock signals which sample the demodulated carrier signals.

In certain system applications, time-varying distorting is introduced into the transmitted carrier signals that is so severe that the carrier and timing recovery circuits are no longer synchronized to the transmitted carrier signals and the data signals can not be recovered. This loss of synchronization is commonly referred to by saying the timing and/or carrier recovery circuits are "out of lock". In the event, such circuits must reacquire synchronization and the time required for this to be accomplished is referred to as the acquisition time. Another parameter pertinent to the performance of carrier and/or timing recovery circuits during loss of synchronization is the acquisition range, i.e., the range of frequency and phase over which such circuits can regain synchronous operation.

While the acquisition time and range of existing carrier and timing recovery circuitry are satisfactory in many system applications, there are applications where these parameters do not meet the desired system performance objectives. In addition, problems relating to hysteresis of existing circuits, phase jitter, and false locking, i.e., locking onto the wrong frequency and/or phase has also arisen. Accordingly, carrier and timing recovery circuits with improved performance in these areas would be highly desirable.

SUMMARY OF THE INVENTION

In accordance with the broadest aspect of the present invention, the performance of carrier and/or timing recovery circuits which control the recovery of data signals from modulated quadrature-related carrier signals is improved by the use of circuitry which correlates the most significant and second-most significant bits of digital signals recovered after demodulation of the carrier signals. This correlation provides a control signal which provides very fast acquisition of synchronous carrier and/or timing recovery circuit operation over a very broad frequency and phase error range.

Pursuant to another aspect of the present invention, the above-described bit correlations of the digital signals recovered after carrier demodulation can be combined with circuitry which reduces phase jitter. Such reduction can be provided by correlating the most significant and least significant bit of the recovered digital signals.

DETAILED DESCRIPTION

Figure 1:
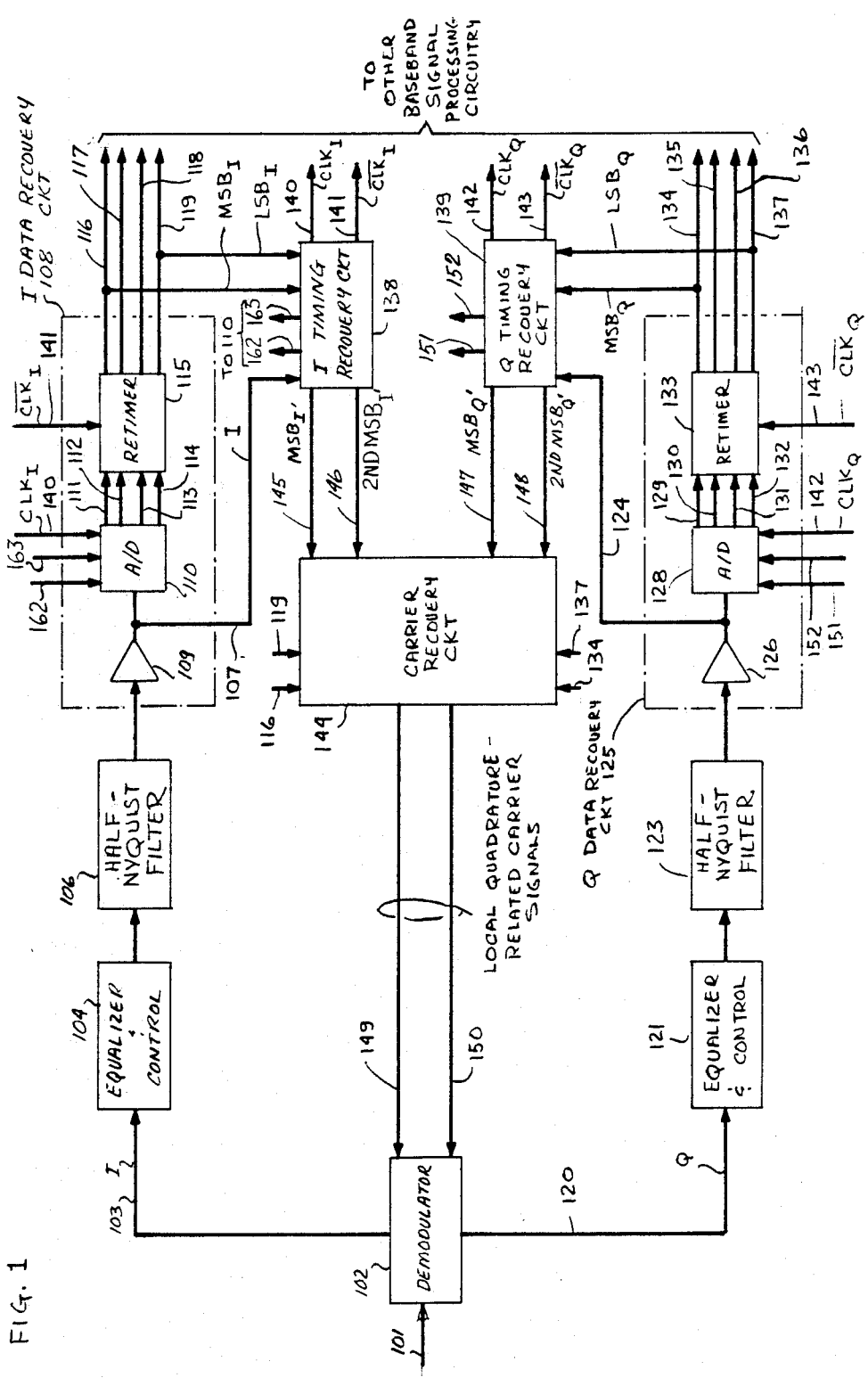
FIG. 1 is a block diagram of an exemplary receiver of a communications systems incorporating an embodiment of the present invention.

FIG. 1 shows an embodiment of the present invention disposed within the receiver of an illustrative communications systems which transmits a 64 QAM signal. At the receiver, the incoming signal, in well known fashion, is coupled from an antenna through frequency translation apparatus (both not shown) to lead 101. such translation apparatus "down-converts" the incoming signal to an intermediate frequency (IF). This IF signal is coupled to demodulator 102, which using quadrature-related carrier signals on leads 149 and 150 produced by carrier recovery circuit 144, generates in-phase (I) and quadrature (Q) channel signals on leads 103 and 120, respectively. Equalizer and coefficient control circuit 104 and half-Nyquist filter 106 respectively remove the distortion from and spectrally shape the I channel signal. Of course, half-Nyquist filtering is merely illustrative and filters which provide more arbitrary spectral shaping could be utilized. I data signal recovery circuit 108 receives the output of filter 106 and recovers the plurality of bits of the I data signals. These bits are ouputted across leads 116–119 on the occurrence of each $\overline{CLK_I}$ pulse. Recovery circuit 108 is controlled by complementary clock signals $CLK_I$ and $\overline{CLK_I}$ on leads 140 and 141 and the reference signals on leads 162 and 163. These four signals are provided by I timing recovery circuit 138 which, being data decision-directed, generated these four signals in response to selected bits of the I data signal on leads 116 and 119 and the I channel signal on lead 107. The term complementary used to describe the clock signals means that the clock signals have equal and opposite logic levels. In similar fashion, equalizer and coefficient control circuit 121 and half-Nyquist filter 123 respectively remove the distortion from the spectrally shaped the Q channel signal. The output of filter 123 is coupled to Q data signal recovery circuit 125 which, controlled by complementary clock signals $CLK_Q$ and $\overline{CLK_Q}$ on leads 142 and 143 and reference signals on leads 151 and 152, recovers the bits of the Q data signal. The bits of the Q data signal appear across leads 134–137 on the occurrence of each $\overline{CLK_Q}$ pulse. The clock and reference signals which control Q data signal recovery circuit 125 are produced by data decision-directed Q timing recovery circuit 139. Circuit 139 produces these clock and reference signals in response to selected bits of the Q data signal on leads 134 and 137 and the Q channel signal on lead 124.

I data signal recovery circuit 108 includes amplifier 10, analog-to-digital (A/D) converter 110 and retimer 115. A/D converter 110 quantizes the amplified I channel signal, produced by amplifier 109, to form the I data signal across leads 111-114 on each $CLK_I$ pulse. Retimer 115, clocked by signal $\overline{CLK_I}$, synchronizes the bits of the I data signal so as to compensate for time differences between the formation of the bits on leads 111-114 by A/D converter 110. The synchronized I data signal bits, including a most significant bit ($MSB_I$) on lead 116, a second most significant bit ($2ndMSB_I$) on lead 117, a third most significant bit on lead 118 and a least significant bit ($LSB_I$) on lead 119, are coupled to other baseband circuitry for further signal processing. In the recited I data signal bit abbreviations, the subscript designates the associated data signal.

Q data signal recovery circuit 125 includes amplifier 126, A/D converter 128 and retimer 133. Coverter 128, clocked by $CLK_Q$, acts in similar fashion to converter 110 to quantize the amplified Q channel signal provided by amplifier 126 into the bits of the Q data signal. These bits appear across leads 129-132 and are retimed by retimer 133 on each $\overline{CLK_Q}$ pulse before being coupled to other baseband signal processing circuitry by leads 134-137. The Q data signal includes bits $MSB_Q$ on lead 134, $2nd\ MSB_Q$ on lead 135, a third most significant bit on lead 136 and $LSB_Q$ on lead 137. Again, in the recited Q data signal bit abbreviations, the subscript identifies the associated data signal.

For the I and Q data signals, the most significant bit indicates the polarity of the associated channel signal with respect to ground. The least significant bit represents the error polarity, i.e., the polarity of the associated channel signal with respect to the closest quantization level of the A/D converter.

Carrier recovery circuit 144 generates the quadrature-related carrier signals on leads 149 and 150 in response to $MSB_I$ on lead 116, $LSB_I$ on lead 119, $MSB_Q$ on lead 134, $LSB_Q$ on lead 137 and other bits generated by I timing recovery circuits 138 on leads 145 and 146 and by Q timing recovery circuit 139 on leads 147 and 148. The bits on leads 145 and 146 are generated by quantizing the signal lead 107 into most significant and second most significant bits. These bits are respectively designated as $MSB_{I'}$ and $2ndMSB_{I'}$ wherein the I in the subscript designates the associated data signal and the prime distinguishes these bits from those generated by A/D converter 110 and appearing on leads 116 and 117. Similarly, the signals on leads 147 and 148 are generated by quantizing the signal on lead 124 into most significant and second most significant bits. These bits are respectively designated as $MSB_{Q'}$ and $2nd\ MSB_{Q'}$ wherein the Q in the subscript reflects the associated data signal and the prime distinguishes these bits from those produced by A/D converter 128 and appearing on leads 134 and 135.

Reviewing the signal processing thus far, it is evident that the I and Q data signal recovery is controlled by the I and Q timing recovery circuits and the carrier recovery circuit. As will be described, each of these circuits in the illustrative embodiment generates the clock and carrier signals by correlating the most significant and second most significant bits of the I and Q data signals.

Figure 2:
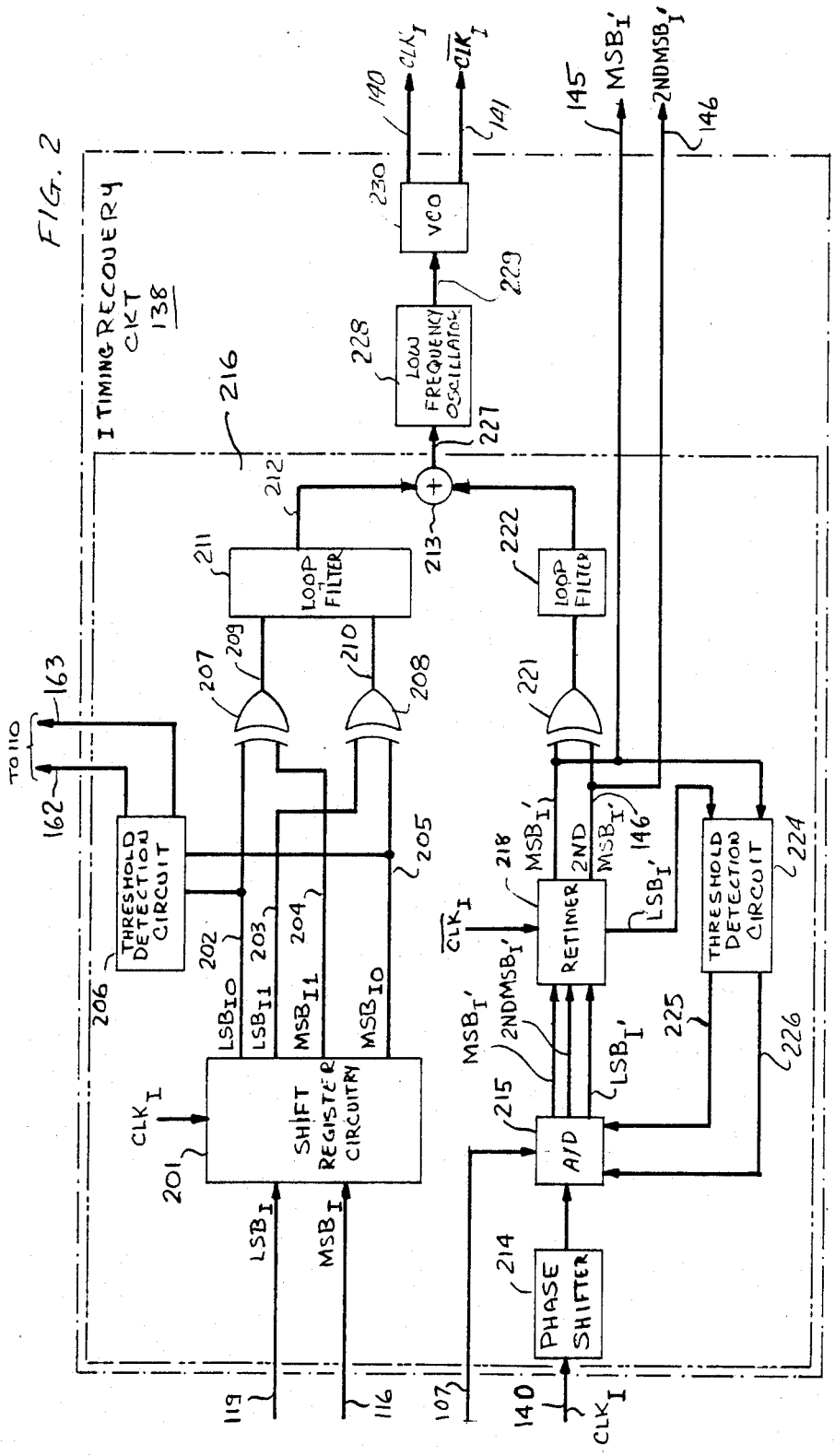
FIG. 2 is a detailed schematic diagram of the timing recover circuits shown in FIG. 1.

Refer now to FIG. 2 which shows the circuitry within I timing recovery circuit 138. Circuit 138 includes a phase detector 216 which is advantageously connected to a voltage controlled oscillator 230 via low frequency oscillator 228. Phase detector 216 provides an error signal, formed by correlations of specific bits of the I data signal, which drives VCO 230 to provide clock signals that are phase aligned with those used in the transmitter. As shown, the I channel signal on lead 107 is coupled to A/D converter 215 which quantizes this signal into a most significant bit, $MSB_{I'}$ and a second most significant bit $2ndMSB_{I'}$, and a least significant bit, $LSB_{I'}$, where the prime in the subscript denotes the bit was formed within a timing recovery circuit. The most significant and least significant bits, as before, respectively indicate the signal and error polarities of the associated channel signal. Converter 215 is clocked by $CLK_I$ after this signal passes through phase shifter 214. The reason for this phase shift will be discussed hereinafter. Retimer 218, clocked by $\overline{CLK_I}$, synchronizes $MSB_{I'}$ and $2ndMSB_{I'}$ and supplies these bits to Exclusive-OR gate 221. Gate 221 correlates $MSB_{I'}$ on lead 145 and $2ndMSB_{I'}$ on lead 146. Bits $MSB_{I'}$ and $LSB_{I'}$ are also supplied to threshold detection circuit 224 wherein they are used to form reference signals which are coupled to A/D converter 215 via leads 225 and 226.

While the bit correlation provided by gate 221 could be used to drive VCO 230, it is preferable to average this correlation. Such averaging is provided by loop filter 222 whose output is connected to summer 213. Furthermore, it is also preferable to couple the averaged correlation of gate 221 first through low frequency oscillator 228 and thence to VCO 230. Oscillator 228, having a nominal frequency several orders of magnitude less than that of VCO 230, advantageously provides a sinusoidal output which sweeps the frequency of VCO 230 to further reduce the acquisition time. Low frequency oscillator 228 automatically stops oscillating once phase-lock is achieved so as to eliminate any residual hase error which might be introduced by its inclusion.

As discussed, the correlation of the two most significant bits of the I data signal with respect to one another provides a timing recovery circuit with faster acquisition time. Now, in applications where phase jitter is of concern, such jitter can be reduced while still maintaining the reduction in acquisition time by combining the correlation of the two most significant bits of the I data signal with crosscorrelations of the most and least significant bits of this data signal. This combination, however, requires that the phase detector characteristic provided by the correlation of the most significant bit and second most significant bit be aligned with the crosscorrelations of the most and least significant bits. Such alignment requires the use of signal $CLK_I$, for clocking A/D converter 110 and a phase-shifted version of signal $CLK_I$, provided by phase shifter 214, in the clocking of A/D converter 215. The above-described combination of bit correlations and crosscorrelations is shown in FIG. 2 and the same will now be discussed.

Referring to FIG. 2, bits $MSB_I$ and $LSB_I$ on leads 116 and 119 are coupled to shift register circuitry 201. Circuitry 210, clocked by $CLK_I$, simultaneously outputs the least significant bit and most significant bit of the I data signal at two successive clock periods. The least significant bits having the designation $LSB_I$ and the most significant bits denoted by $MSB_I$ will now be further designated by the subscript 0 and 1 wherein the 0 denotes the more recent of the two clock periods and the 1 denotes the immediately prior clock period. Exclusive-OR gate 207 crosscorrelates the least significant bit at the more recent clock period, $LSB_{I0}$, and the most significant bit at the immediately prior clock period, $MSB_{I1}$, while Exclusive-OR gate 208 crosscorrelates the most significant bit at the more recent clock period, $MSB_{I0}$ and the least significant bit at the immediately preceding clock period, $LSB_{I1}$. Bits $LSB_{I0}$ and $MSB_{I0}$ are also coupled to threshold detection circuit 206 which generates reference signals for A/D converter 110 on leads 162 and 163.

While the difference between the crosscorrelations provided by gates 207 and 208 can be directly combined with the output of filter 222, it is preferable to average the difference between these crosscorrelations. As shown, such averaging is provided by loop filter 211. The outputs of filters 211 and 222 are then combined by summer 213. Consequently, the use of summer 213, is unnecessary where a reduction in phase jitter is not required and the summing of the above-described averaged bit crosscorrelations and the averaged correlations provided by loop filter 22 is not necessary.

Reviewing FIGS. 1 and 2, it will be noted that one A/D converter, supplied with a first set of reference signals, is used for the correlation of $MSB_I$ and $2ndMSB_I$ while another A/D converter, supplied with a second set of reference signals independent of the first, is used for the correlation of $MSB_I$ and $LSB_I$. This structure advantageously provides proper operation of timing recovery circuit 138 when synchronous operation is lost.

Q timing recovery circuit 139 of FIG. 1 can be identical in structure to that of FIG. 2 except that this timing recovery circuit is responsive to the Q data signal on lead 124 and $MSB_Q$ and $LSB_Q$ on leads 134 and 137, respectively. Or, the Q timing recovery circuit can be a "slave" unit which merely introduces a predetermined manually or automatically controlled phase shift into signals $CLK_I$ and $\overline{CLK_I}$, provided by "master" timing recovery circuit 138, so as to compensate for differences in signal propagation times between the I and Q channels. In this latter case, signals $CLK_I$, $\overline{CLK_I}$, $CLK_Q$ and $\overline{CLK_Q}$ are generated by the timing recovery circuits in response to the most significant 2nd most significant and least significant bits of the I data signal. Furthermore, as the designation of master and slave can be reversed, it can be said that the four recited clock signals can be generated in response to the most significant, 2nd most significant and least significant bits of a selected one of the data signals.

Figure 3:
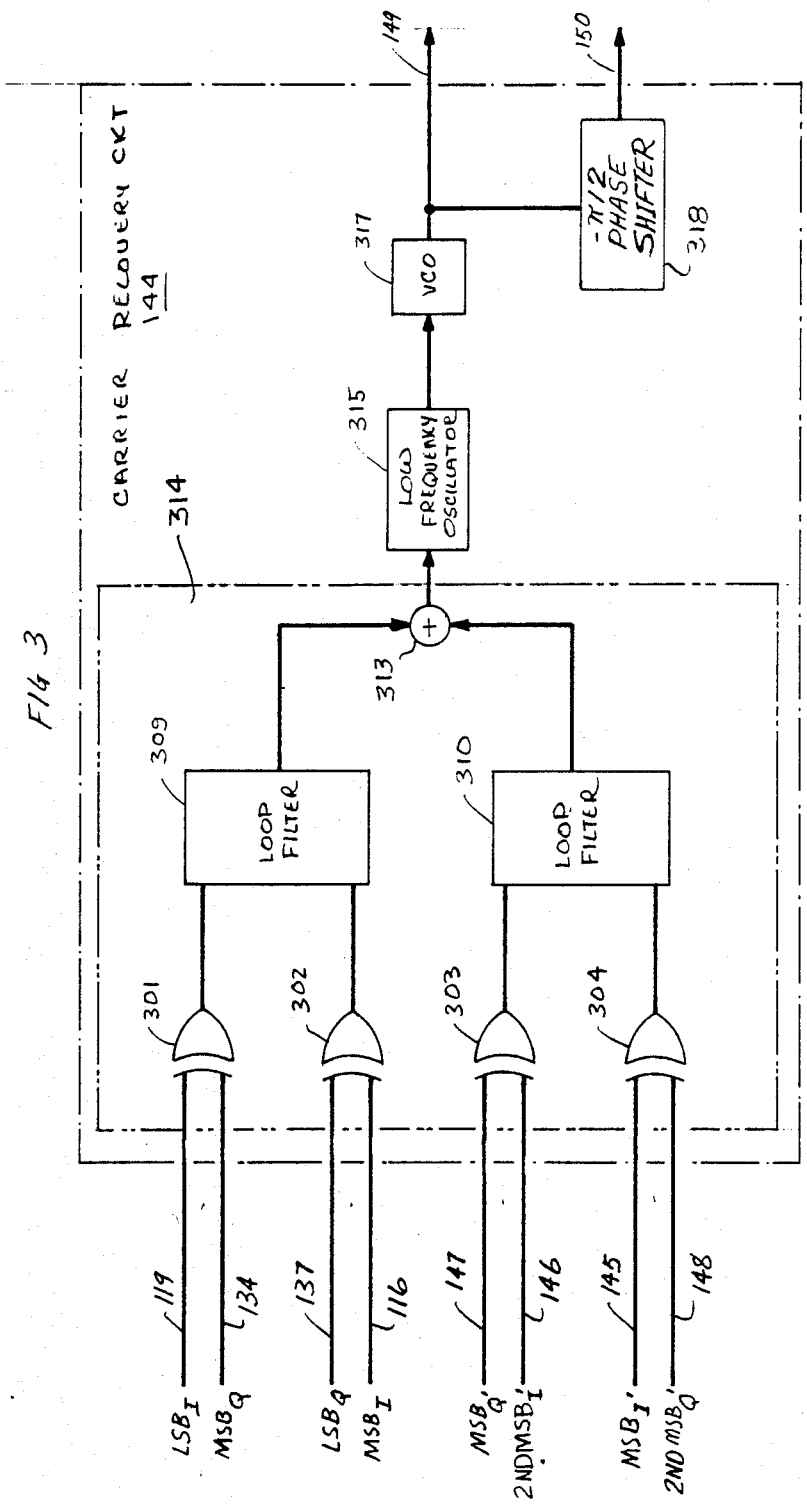
FIG. 3 is a detailed schematic diagram of the carrier recovery circuit used in FIG. 1.

Refer now to FIG. 3 which shows the operation of carrier recovery circuit 144. Carrier recovery circuit 144 includes a phase detector 314, a low frequency oscillator 315, a VCO 317 and a phase shifter 318. Phase detector 314 generates an error signal which drives the local quadrature-related carrier signals on leads 149 and 150 into phase alignment with the incoming carriers on lead 101 of FIG. 1. As with the timing recovery circuits, this error signal is produced by correlating different combinations of the two most significant bits from the I and Q data signals wherein each bit in a correlation is from a different one of the two bit positions in a different data signal. As shown, Exclusive-OR gate 303 correlates the most significant bit from the Q data signal produced within Q timing recovery circuit 139, $MSB_Q$, and appearing on lead 147 with the second most significant bit of the I data signal formed within I timing recovery circuit 138, $2nd\ MSB_I$, and appearing on lead 146. In addition, Exclusive-OR gate 304 correlates the most significant bit of I data signal formed within the I timing recovery circuit, $MSB_I$, and appearing on lead 145 with the second most significant bit of the Q data signal formed within the Q timing recovery circuit, $2nd\ MSB_Q$, and appearing on lead 148. Again, while the difference between the correlations provided by gates 303 and 304 could be connected to VCO 317, it is preferable to average this difference via loop filter 310 as illustrated. Moreover, it is also preferable that there averaged correlations be coupled through low frequency oscillator 315 to VCO 317 to further reduce the acquisition time of carrier recovery circuit 144. Low frequency oscillator 315, having a nominal frequency many orders of magnitude less than that of VCO 317, functions in the same manner as its counterpart in the timing recovery circuit of FIG. 2.

As with the operation of the timing recovery circuit, the correlations of gates 303 and 304 can be advantageously combined with correlations of the most and least significant bits of the I and Q data signals to lessen phase jitter. For carrier recovery operation, however, each of the different combinations of the most and least significant bits of different data signals is correlated as compared to timing recovery operation wherein crosscorrelations of these bits of the same data signal are formed. As illustrated, Exclusive-OR gate 301 correlates $LSB_I$ and $MSB_Q$ while Exclusive-OR gate 302 correlates $LSB_Q$ and $MSB_I$. The difference between the correlations provided by gates 301 and 302 is again preferably averaged by loop filter 309 and then added via summer 313 to the averaged difference between the correlations provided by gates 303 and 304. The sum of all the foregoing correlations drives VCO 317 to provide a carrier signal on lead 149 which is phase-aligned with one of the incoming quadrature-related carrier signals. The other one of the quadrature-related carrier signals is then produced on lead 150 by coupling the carrier signal of lead 149 through $-\pi/2$ phase shifter 318.

It should, of course, be understood that while the present invention has been disclosed in terms of a specific embodiment, numerous other arrangements may be apparent to those skilled in the art without departing from the spirit and scope of this invention. For example, while the present invention has been disclosed in reference to a 64 QAM communications system, the present invention is not restricted to a specific number of modulation levels. Indeed, the present invention can be used with 16 QAM, 4 PSK, etc. In addition, while separate A/D converters are used in the data recovery and timing recovery circuits, one such converter could be shared between these circuits. Such sharing would merely require the use of transfer switches which direct the A/D output to circuits which correlate either the most and 2nd most significant bits or the most and least significant bits. The former correlation would be provided during acquisition while the latter would be provided once synchronous operation is achieved. Control of the transfer switches can either be manual or automatic, the latter being readily available by detecting the operation of the low frequency oscillator via well-known circuitry coupled to lead 229.

What is claimed is:

1. Receiver apparatus for use in a communications system wherein first and second data signals are recovered from quadrature-related carrier signals, at least one of said data signals comprising a most significant bit, second-most significant bit and a least significant bit, said apparatus comprising first means for correlating said most significant bit and said second-most significant bit of said at least one data signal recovered at a given time; and means responsive to said first correlating means for controlling the recovery of said first and second data signals from said quadrature-related carrier signals at another time subsequent to said given time.

2. The apparatus of claim 1 wherein said first correlating means correlates the most significant and second-most significant bits of said first data signal and correlates the most and second-most significant bits of said second data signal.

3. The apparatus of claim 2 wherein said first correlating means also correlates the most significant bit from said first data signal and the second-most significant bit from said second data signal and correlates the most significant bit of said second data signal and said second-most significant bit of said first data signal.

4. The apparatus of claim 1 wherein said first correlating means correlates the most significant bit of said first data signal and the second-most significant bit of said second data signal and correlates the most significant bit of said second data signal and the second-most significant bit of said first data signal.

5. The apparatus of claim 2 wherein said first and second data signals are recovered at each of a succession of times and said apparatus further includes second correlating means for correlating the most significant bit and least significant bit of said at least one data signal, said most and least significant bits being from the same data signal, said most significant bit being at a first time and said least significant bit being at a second time, the correlations provided by said second correlating means being supplied to said controlling means.

6. The apparatus of claim 4 wherein said first and second data signals are recovered at each of a succession of times and said apparatus further includes second correlating means for correlating the most significant bit and least significant bit of said at least one data signal, said most and least significant bits being from the same data signal, said most significant bit being at a first time and said least significant bit being at a second time, the correlations provided by said second correlating means being supplied to said controlling means.

7. The apparatus of claim 1 wherein said controlling means includes a timing recovery circuit which generates a clock signal for recovering said data signals.

8. The apparatus of claim 1 wherein said controlling means includes a carrier recovery circuit which generates a pair of local quadature-related carrier signals for demodulating said gradrature-related carrier signals.

* * * * *

UNITED STATES PATENT AND TRADEMARK OFFICE
CERTIFICATE OF CORRECTION

PATENT NO. : 4,726,043
DATED : February 16, 1988
INVENTOR(S) : Louis L. Levesque It is certified that error appears in the above-identified patent and that said Letters Patent is hereby corrected as shown below:

Column 1, line 59 "has" should read --have--.
Column 2, line 20 "recover" should read --recovery--.
Column 2, line 52 "generated" should read --generates--.
Column 3, line 5 "10," should read --109--.
Column 3, line 44 "circuits" should read --circuit--.
Column 4, line 41 "hase" should read --phase--.
Column 4, line 65 "210" should read --201--.
Column 5, line 47 "significant 2nd most" should read --significant, 2nd most--
Column 8, line 31 "gradrature" should read --quadrature--.
Column 2, line 59 "the spectrally shaped" should read --and spectrally shape--

Signed and Sealed this

Eighteenth Day of July, 1989

Attest:

DONALD J. QUIGG

Attesting Officer

Commissioner of Patents and Trademarks